US012586929B2

(12) United States Patent
Kang et al.

(10) Patent No.: US 12,586,929 B2
(45) Date of Patent: Mar. 24, 2026

(54) DUAL POLARIZATION ANTENNA AND DUAL POLARIZATION ANTENNA ASSEMBLY COMPRISING SAME

(71) Applicant: KMW INC., Hwaseong-si (KR)

(72) Inventors: Seong Man Kang, Hwaseong-si (KR); Oh Seog Choi, Hwaseong-si (KR); Hun Jung Jung, Hwaseong-si (KR); Gyo Jin Jo, Yongin-si (KR); Su Yong Lee, Seoul (KR)

(73) Assignee: KMW INC., Hwaseong-si (KR)

( * ) Notice: Subject to any disclaimer, the term of this patent is extended or adjusted under 35 U.S.C. 154(b) by 66 days.

(21) Appl. No.: 18/540,966

(22) Filed: Dec. 15, 2023

(65) Prior Publication Data

US 2024/0128658 A1 Apr. 18, 2024

Related U.S. Application Data

(63) Continuation of application No. PCT/KR2022/008203, filed on Jun. 10, 2022.

(30) Foreign Application Priority Data

Jun. 16, 2021 (KR) ........................ 10-2021-0078324

(51) Int. Cl.
*H01Q 21/24* (2006.01)
*H01Q 1/40* (2006.01)
(Continued)

(52) U.S. Cl.
CPC ............. *H01Q 25/001* (2013.01); *H01Q 1/40* (2013.01); *H01Q 1/38* (2013.01)

(58) Field of Classification Search
CPC .. H01Q 5/25; H01Q 1/32; H01Q 1/38; H01Q 1/1278; H01Q 1/325; H01Q 15/0013; H01Q 1/1271
See application file for complete search history.

(56) References Cited

U.S. PATENT DOCUMENTS

2020/0321712 A1* 10/2020 Seo ........................ H01Q 21/26

FOREIGN PATENT DOCUMENTS

CN 107528115 A 12/2017
CN 111769360 A 10/2020
(Continued)

OTHER PUBLICATIONS

Non-final Office Action mailed on Oct. 29, 2024 from the Japanese Patent Office for Japanese Application No. 2023-573339 and its English translation.

(Continued)

*Primary Examiner* — David E Lotter
(74) *Attorney, Agent, or Firm* — Insight Law Group, PLLC; Seung Lee

(57) ABSTRACT

A dual polarization antenna is disclosed in at least one embodiment of the present disclosure, including a base substrate, a power feeding unit supported on the base substrate, and a radiating plate supported on the power feeding unit, wherein the first feeding substrate includes a first insulating substrate supported on the base substrate, and a first feed line attached to the first insulating substrate and configured to supply a first reference phase signal to a first point on the radiating plate and to supply to a second point on the radiating plate, a first reverse phase signal having a reverse phase relative to the first reference phase signal, and wherein the second feeding substrate includes a second insulating substrate supported on the base substrate, and a second feed line attached to the first insulating substrate and configured to supply a second reference phase signal to a third point on the radiating plate and to supply to a fourth point on the radiating plate, a second reverse phase signal having a reverse phase relative to the second reference phase signal.

7 Claims, 7 Drawing Sheets

1

(51) Int. Cl.
*H01Q 25/00* (2006.01)
*H01Q 1/38* (2006.01)

(56) References Cited

FOREIGN PATENT DOCUMENTS

| | | | |
|---|---|---|---|
| EP | 3731345 | A1 | 10/2020 |
| JP | S62-92604 | A | 4/1987 |
| JP | H11-266070 | A | 9/1999 |
| JP | 2021-506201 | A | 2/2021 |
| KR | 10-2004-0090417 | A | 10/2004 |
| KR | 10-0793036 | B1 | 1/2008 |
| KR | 10-2019-0074064 | A | 6/2019 |
| KR | 10-2020-0132618 | A | 11/2020 |
| WO | 2019/124844 | A1 | 6/2019 |

OTHER PUBLICATIONS

International Search Report mailed Oct. 6, 2022 for International Application No. PCT/KR2022/008203 and its English translation.
European Search Report mailed Apr. 24, 2025 from the European Patent Office for European Application No. 22825234.2.
Office Action mailed on Jul. 23, 2025 from Korean Patent Office for Application No. 10-2021-0078324 and its English translation.

* cited by examiner

DUAL POLARIZATION ANTENNA AND DUAL POLARIZATION ANTENNA ASSEMBLY COMPRISING SAME

CROSS-REFERENCE TO RELATED APPLICATIONS

This application is a continuation application of International Application No. PCT/KR2022/008203, filed Jun. 10, 2022, which claims the benefit of Korean Patent Application No. 10-2021-0078324, filed Jun. 16, 202, in the Korean Intellectual Property Office, the disclosures of which are incorporated herein in their entirety by reference.

TECHNICAL FIELD

The present disclosure relates to a dual polarization antenna and dual polarization antenna assembly comprising the same.

BACKGROUND

Massive multiple-input multiple-output (MIMO) technology is a spatial multiplexing technique for dramatically enhancing the data transmission capacity by using a plurality of antennas, in which a transmitter transmits different data via the respective transmitting antennas and a receiver detects the transmitted different data one by one through appropriate signal processing. Therefore, the greater the number of the transmit antennas and the receive antennas in tandem, the greater channel capacity is obtained to allow more data to be transmitted. For example, increasing the number of antennas to 10 provides approximately 10 times the channel capacity of current single antenna systems by using the same frequency band.

As massive MIMO technologies require multiple antennas, the importance of reducing the space occupied by a single antenna module, i.e., reducing the size of individual antennas, is further emphasized. A dual polarization antenna is a technology that transmits and receives two electromagnetic wave signals that are perpendicular to each other with a single antenna element, and is considered to be advantageous for miniaturizing antenna structures.

DISCLOSURE

Technical Problem

Accordingly, a challenge that the present disclosure seeks to address is to provide a dual polarization antenna that is advantageous for antenna miniaturization.

The present disclosure further seeks to provide a dual polarization antenna that can improve inter-polarization isolation and cross-polarization discrimination while reducing the number of process connections and complexity of signal wiring for the betterment of the manufacturing process.

Another challenge that the present disclosure to address is to provide an antenna element that has increased structural stability and is relatively easy to mass produce.

It will be apparent to those skilled in the art from the following description that the subject matter to which the present disclosure is directed is not limited to the challenges set forth above but encompasses other unmentioned technical tasks to be addressed.

SUMMARY

The present disclosure in least one embodiment provides a dual polarization antenna including a base substrate, a power feeding unit supported on the base substrate, and a radiating plate supported on the power feeding unit, wherein the first feeding substrate includes a first insulating substrate supported on the base substrate, and a first feed line attached to the first insulating substrate and configured to supply a first reference phase signal to a first point on the radiating plate and to supply to a second point on the radiating plate, a first reverse phase signal having a reverse phase relative to the first reference phase signal, and wherein the second feeding substrate includes a second insulating substrate supported on the base substrate, and a second feed line attached to the first insulating substrate and configured to supply a second reference phase signal to a third point on the radiating plate and to supply to a fourth point on the radiating plate, a second reverse phase signal having a reverse phase relative to the second reference phase signal.

The first feeding substrate and the second feeding substrate may each include an adhesive tape pattern disposed on each of the first insulating substrate and the second insulating substrate, and the first feedline and the second feedline may each include a metal pattern attached to the adhesive tape pattern.

The metal pattern may further include a waterproof adhesion technology (WAT) treatment layer that is disposed on the adhesive tape pattern.

The WAT treatment layer may be disposed on the adhesive tape pattern.

The adhesive tape pattern on the first insulating substrate, the adhesive tape pattern on the second insulating substrate, and the WAT treatment layer of the metal pattern may be fixed through a heat-curing process.

The first feeding substrate and the second feeding substrate may be vertically upright on the base substrate, and the first feeding substrate and the second feeding substrate may have respective midsections that intersect perpendicular to each other.

The first feeding substrate may be disposed parallel to a straight line connecting the first point and the second point, and the second feeding substrate may be disposed parallel to a straight line connecting the third point and the fourth point.

The radiating plate may be square. The first point, the second point, the third point, and the fourth point may be adjacent to four vertices of the radiating plate. The radiating plate may have a diagonal length that is equal to a half wavelength of a center frequency of a frequency in use.

The first feed line may be connected to a signal line of the base substrate through one solder joint, and the second feed line may be connected to another signal line of the base substrate through another solder joint.

The present disclosure in another embodiment provides a dual polarization antenna assembly including a casing, one or more of the dual polarization antenna according to claim 1 disposed on the casing, and a radome configured to cover one or more of the dual polarization antenna.

Other specific details of the present disclosure are contained in the detailed description and drawings.

Advantageous Effects

The dual polarization antenna according to the present disclosure has the effect of reducing the overall component size.

The dual polarization antenna according to the present disclosure can improve inter-polarization isolation and cross-polarization discrimination while reducing the number of process connections and complexity of signal wiring for the betterment of the manufacturing process.

The dual polarization antenna according to the present disclosure has improved structural stability and is easy to mass produce.

REFERENCE NUMERALS

Figure 1:
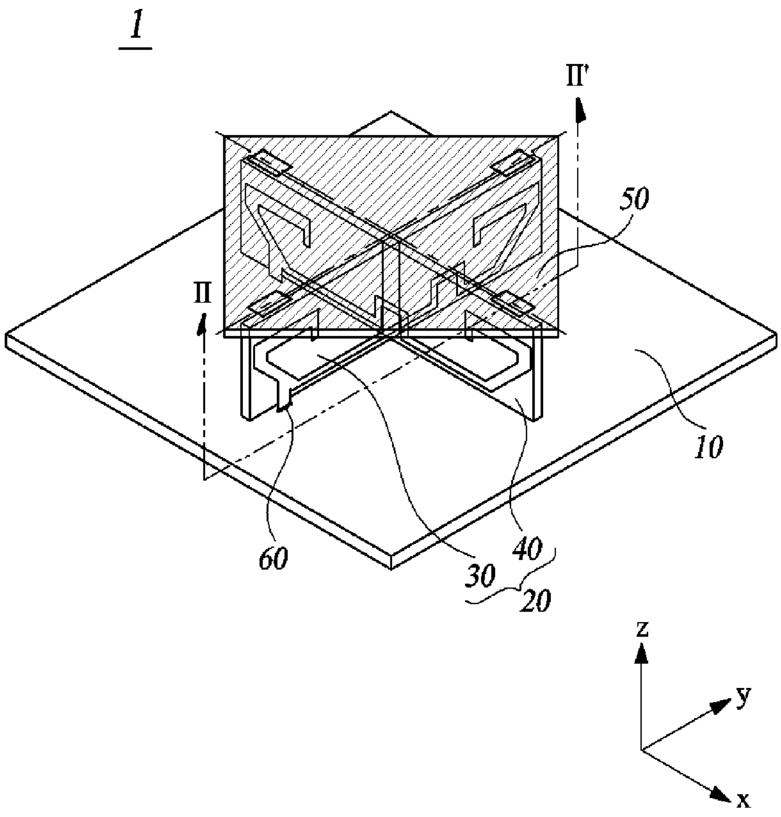
FIG. 1 is a schematic perspective view of a dual polarization antenna according to at least one embodiment of the present disclosure.

| | |
|---|---|
| 1: dual polarization antenna | 10: base substrate |
| 20: power feeding unit | 30: first feeding substrate |
| 40: second feeding substrate | 50: radiating plate |

DETAILED DESCRIPTION

Hereinafter, some embodiments of the present disclosure will be described in detail with reference to the accompanying illustrative drawings. In the following description, like reference numerals preferably designate like elements, although the elements are shown in different drawings. Further, in the following description of some embodiments, a detailed description of related known components and functions when considered to obscure the subject of the present disclosure will be omitted for the purpose of clarity and for brevity.

Embodiments of the present disclosure will be described in detail below with reference to the accompanying drawings.

FIG. 1 is a schematic perspective view of a dual polarization antenna according to at least one embodiment of the present disclosure.

Figure 2:
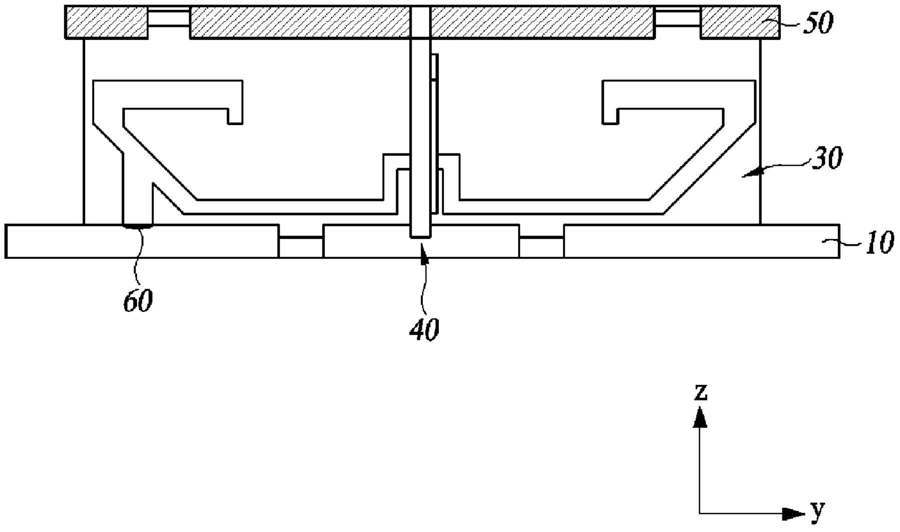
FIG. 2 is a cross-sectional view of the dual polarization antenna taken along line II-II' of FIG. 1.

FIG. 2 is a cross-sectional view of the dual polarization antenna taken along line II-II' of FIG. 1.

Figure 3:
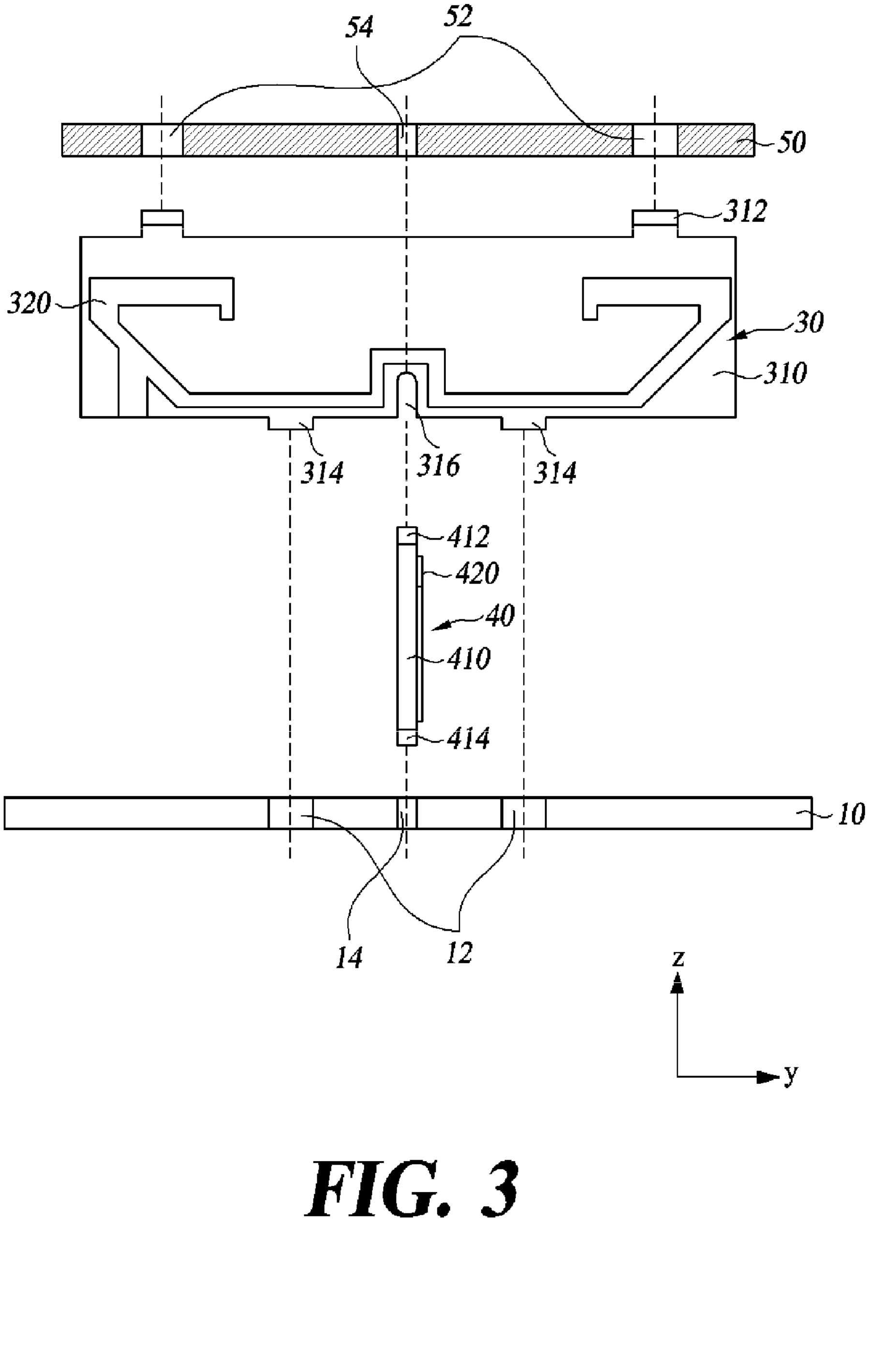
FIG. 3 is an exploded sectional view of the dual polarization antenna along the line II-II' of FIG. 1.

FIG. 3 is an exploded sectional view of the dual polarization antenna along the line II-II' of FIG. 1.

Figure 4:
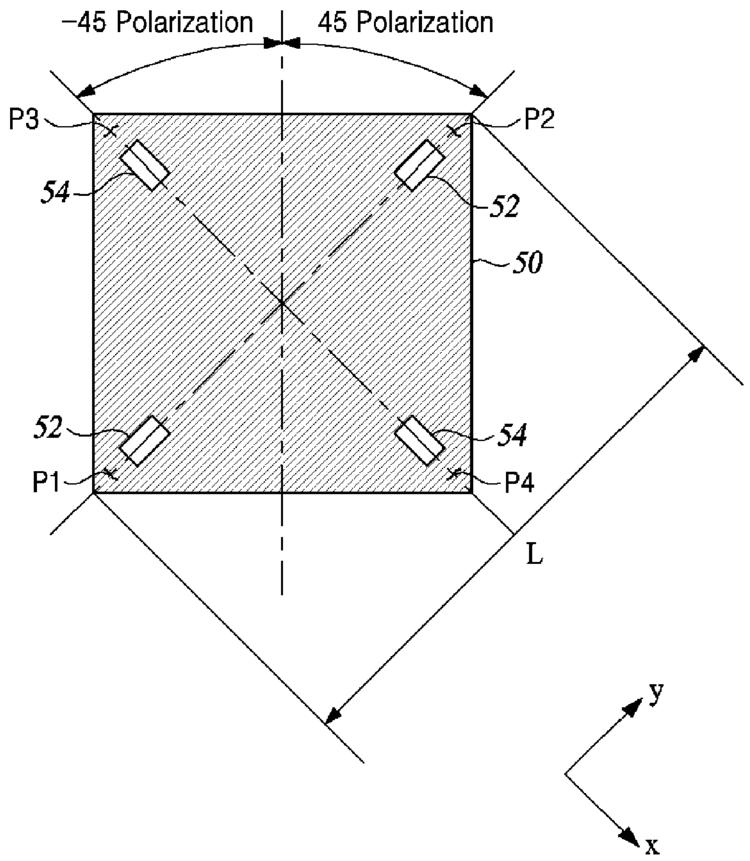
FIG. 4 is a top view of a dual polarization antenna according to at least one embodiment of the present disclosure.

FIG. 4 is a top view of a dual polarization antenna according to at least one embodiment of the present disclosure.

Referring to FIGS. 1 to 4, a dual polarization antenna 1 according to at least one embodiment of the present disclosure may include a base substrate 10, a power feeding unit 20, and a radiating plate 50.

The base substrate 10 may be a plate-like member made of plastic or metal. The base substrate 10 may include a ground layer. The ground layer of the base substrate 10 may provide a ground for the dual polarization antenna, while also acting as a reflective surface for radio signals emitted from the radiating plate 50. Thereby, the radio signal radiated from the radiating plate 50 toward the base substrate 10 may be reflected in the main radiation direction. Accordingly, the front-to-back ratio and gain of the dual polarization antenna according to at least one embodiment of the present disclosure can be improved.

The power feeding unit 20 is supported on the base substrate 10 and is configured to supply a high-frequency electrical signal to the radiating plate 50. The power feeding unit 20 may include a first feeding substrate 30 and a second feeding substrate 40 arranged to cross each other on the base substrate 10.

In at least one embodiment of the present disclosure, the first feeding substrate 30 and the second feeding substrate 40 are disposed vertically upright on the base substrate 10, and the first feeding substrate 30 and the second feeding substrate 40 may cross each other perpendicular to each other in their respective center regions.

Furthermore, in at least one embodiment of the present disclosure, the first feeding substrate 30 and the second feeding substrate 40 are illustrated as integrally molded, i.e., the power feeding unit 20 that is composed of the first feeding substrate 30 and the second feeding substrate 40 may have an appearance of one-piece support having a "+" or cross shape.

The first feeding substrate 30 may include a first insulating substrate 310 and a first feed line 320 disposed on the first insulating substrate 310. The second feeding substrate 40 may include a second insulating substrate 410 and a second feed line 420 disposed on the second insulating substrate 410.

The first feed line 320 and the second feed line 420 may each supply a high-frequency electrical signal to the radiating plate 50. In the illustrated embodiment, the first feed line 320 and the second feed line 420 are each illustrated as being electrically capacitively coupled to the radiating plate 50 a short distance apart. However, the present disclosure is not so limited, and in other embodiments, the first feed line 320 and the second feed line 420 may each be in direct electrical contact with the radiating plate 50.

The first feeding substrate 30 may include one or more first substrate coupling protrusions 314 formed on one long side thereof. The second feeding substrate 40 may include one or more second substrate coupling protrusions 414 formed at one end thereof.

Correspondingly, the base substrate 10 may include first substrate-side coupling grooves into which the first substrate coupling protrusions of the first feeding substrate 30 are inserted and second substrate-side coupling grooves into which the second substrate coupling protrusions of the second feeding substrate 40 are inserted.

In the illustrated embodiment of the present disclosure, the two first substrate coupling protrusions 314 and two second substrate coupling protrusions 414 are formed, and the corresponding first and second substrate-side coupling grooves are formed in two, respectively. However, the present disclosure is not so limited. In other embodiments of the present disclosure, the number of the substrate coupling protrusions and the coupling grooves may be optionally varied, and further, the first feeding substrate 30 and the second feeding substrate 40 may be fastened onto the base substrate 10 by adhesion or a separate coupling member rather than insertion fastening.

The first feeding substrate 30 may include a first mating slit 316 formed on one long side thereof. The first mating slit

316 may be a linear opening extending from the center of one long side of the first feeding substrate 30 to the inside thereof.

Similarly, the second feeding substrate 40 may include a second mating slit 416 (not shown) formed on the other long side thereof. The second mating slit 416 may be a linear opening extending from the center of the other long side of the second feeding substrate 40 to the interior thereof.

Through the first mating slit 316 and the second mating slit 416, the first feeding substrate and the second feeding substrate may be arranged to intersect each other.

In at least one embodiment of the present disclosure, the first feeding substrate 30 and the second feeding substrate 40 may have substantially the same structure and electrical properties. For example, the length, width, and thickness of the first feeding substrate 30 and the second feeding substrate 40 may be substantially the same but differ only by the respective structural features for allowing the first feeding substrate 30 and the second feeding substrate 40 to intersect each other, for example, the direction and structure of the coupling slits and some of the geometry of the feed lines thereon.

The radiating plate 50 is supported on the power feeding unit 20, that is, on the first feeding substrate 30 and the second feeding substrate 40. In at least one embodiment of the present disclosure, the radiating plate 50 may include a metal layer attached to one surface thereof. The radiating plate 50 may be disposed parallel to the base substrate 10 and perpendicular to the first feeding substrate 30 and the second feeding substrate 40.

In at least one embodiment of the present disclosure, the radiating plate 50 is illustrated as having a rectangular shape, with the first feeding substrate 30 and the second feeding substrate 40 each disposed across a diagonal direction of the radiating plate 50. However, the present disclosure is not limited to this configuration. The shape of the radiating plate 50 may be polygonal, circular, or annular.

The radiating plate 50 may include one or more first radiating plate-side coupling grooves 52 and one or more second radiating plate-side coupling grooves 54. Correspondingly, the first feeding substrate 30 may include one or more first radiating-plate coupling protrusions 312 formed on its other long side, and the second feeding substrate 40 may include one or more second radiating-plate coupling protrusions 412 formed on its other long side.

The first radiating-plate coupling protrusions 312 and the second radiating-plate coupling protrusions 412 may be inserted into and engage the first radiating plate-side coupling grooves 52 and the second radiating plates-side coupling grooves 54, respectively. This allows the radiation plate 50 to be spaced apart from and firmly supported on the base board 10 through the first feeding substrate 30 and the second feeding substrate 40.

The first feed line 320 of the first feeding substrate 30 supplies a first reference-phase signal to a first point P1 on the radiating plate 50 and a first reverse-phase signal to a second point P2 on the radiating plate 50.

Similarly, the second feed line 420 of the second feeding substrate 40 supplies a second reference-phase signal to a third point P3 on the radiating plate 50 and a second reverse-phase signal to a fourth point P4 on the radiating plate 50.

Here, the first reference phase signal and the first reverse phase signal are high-frequency signals having opposite phases to each other, and the second reference phase signal and the second reverse phase signal are also high-frequency signals having opposite phases to each other.

In the dual-polarized antenna according to at least one embodiment of the present disclosure, the straight line connecting first point P1 and second point P2 on the radiation plate 50 and the straight line connecting third point P3 and fourth point P4 on the radiation plate 50 are orthogonal to each other. Therefore, a polarized wave (45 polarization) may be radiated in the direction of the straight line connecting first point P1 and second point P2, and the other polarized wave (−45 polarization) may be radiated in the direction of the straight line connecting third point P3 and fourth point P4.

A distance L between the first point P1 and the second point P2 and distance L between the third point P3 and the fourth point P4 depends on the center frequency wavelength ($\lambda c$) of the frequency band used, but their distances may vary depending on the properties and materials to be targeted. For example, distance L may vary depending on the degree of separation between cross-polarized waves or degree of inter-polarization isolation, the half-power beamwidth, and the dielectric constant of the material of the radiating plate 50.

In at least one embodiment of the present disclosure, the first point P1 and the second point P2 as well as the third point P3 and the fourth point P4 may be adjacent to the two farthest points from each other on the square radiating plate 50, for example, two vertices facing diagonally. For example, the first point P1 and the fourth point P4 on the dual polarization antenna according to at least one embodiment of the present disclosure may be respectively adjacent to four vertices of the square radiating plate 50. Thus, the dual polarization antenna according to at least one embodiment of the present disclosure can have the most compact structure corresponding to the frequency in use.

Figure 5:
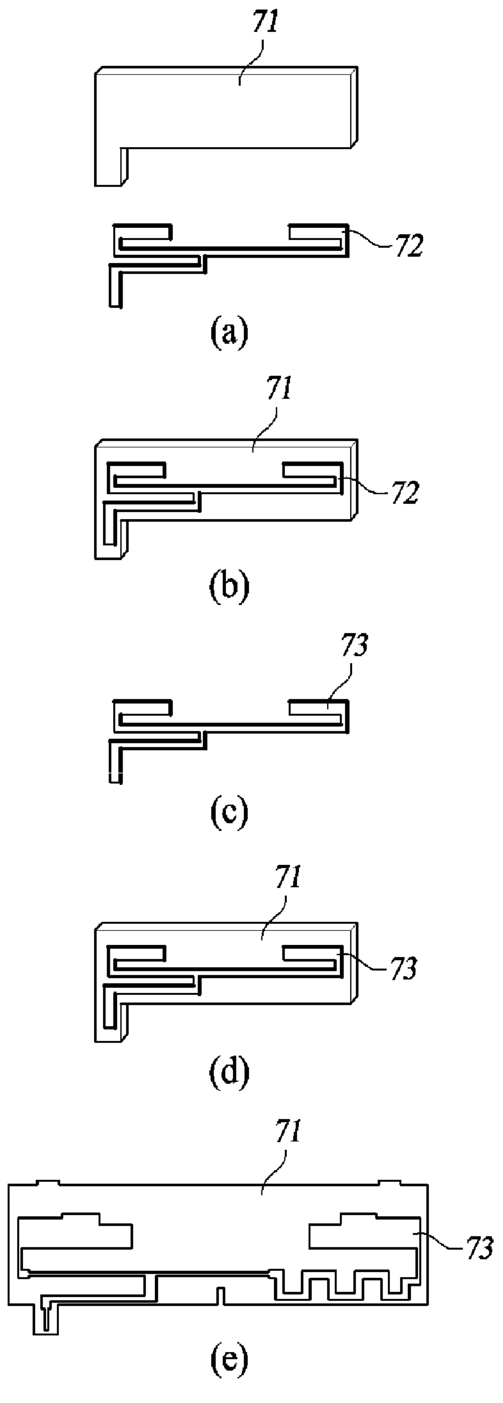
FIG. 5 is a diagram illustrating a method of manufacturing a dual polarization antenna according to at least one embodiment of the present disclosure.

FIG. 5 is a diagram illustrating a method of manufacturing a dual polarization antenna according to at least one embodiment of the present disclosure.

Referring to FIG. 5, the feeding substrates and the radiating plate of the dual polarization antenna according to at least one embodiment of the present disclosure may be manufactured in a manner that a metal pattern is attached to an insulating substrate.

In FIG. 5, the formation of one feeding substrate is illustrated, but other feeding substrates and the radiating plate may be manufactured by the same process, according to the present disclosure.

First, as shown in FIG. 5 by step (a), an insulating substrate 71 and an adhesive tape pattern 72 of the feeding substrate are prepared.

In at least one embodiment of the present disclosure, the insulating substrate 71 is made of a plastic material and may be selected as a material having a suitable dielectric constant (insulating nature) while having a suitable weight, strength, and high heat resistance.

For example, the method may select a material other than the material that conventionally constitutes a printed circuit board, for example, polyimide, and as long as structural stability is ensured, it may select a material that is sufficiently light and easily processable.

The adhesive tape pattern 72 may have a shape corresponding to the shape of the conductive pattern to be formed on the insulating substrate 71. The adhesive tape 72 may be made of a material that has good adhesion to the insulating substrate 71, and the type of material may vary depending on the material of the insulating substrate 71 selected. Although not shown, the adhesive tape pattern 72 may further include a release film which may be removed after the adhesive tape pattern 72 is attached to the insulating substrate 71.

Then, in the process between steps (a) and (b) of FIG. 5, the adhesive tape pattern 72 is laminated to the insulating substrate 71.

Then, in step (b) of FIG. 5, the insulating substrate 71 and the adhesive tape pattern 72 are maintained in a temporary bonded state.

As used herein, a temporary bonded or pseudo-bonded state means a state in which sufficient adhesion is maintained but not completely fixed through heat curing or otherwise.

Then, in step (c) of FIG. 5, the method prepares a metal pattern 73 that has been treated with Waterproof Adhesion Technology ("WAT") or so-called dissimilar material adhesion technology.

WAT technology refers to a chemical and/or physical bonding technology for various heterogeneous materials, in particular between metals and plastics, and in the present disclosure, WAT treatment can be understood as forming a plurality of nano-holes and nano-linkers on the metal pattern 73.

The metal pattern 73 may be made of a material such as nickel silver, STS304 (plated), phosphor bronze (plated), aluminum (plated), or the like.

Then, in the process between steps (c) and (d) of FIG. 5, the WAT-treated metal pattern 73 is laminated by aligning it with the insulating substrate 71 and the adhesive tape pattern 72.

Thus, in step (d) of FIG. 5, the insulating substrate 71, the adhesive tape pattern 72, and the metal pattern 73 are in a state of pseudo-bonding.

Then, in the process between steps (d) and (e) of FIG. 5, a heat curing process is performed by heating the bonded elements to an appropriate temperature for a certain time.

After the heat curing process, a single feeding substrate is completed, as shown in step (e) of FIG. 5.

Figure 6:
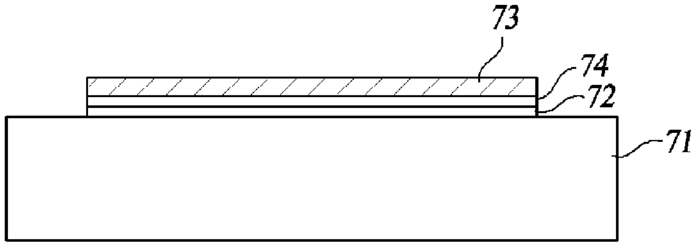
FIG. 6 is a cross-sectional view of a formed feeding substrate.

FIG. 6 is a cross-sectional view of a formed feeding substrate.

Referring to FIG. 6, the formed feeding substrate includes an insulating substrate 71, a layer of adhesive tape pattern 72 on the insulating substrate 71, a WAT treatment layer 74 on the layer of adhesive tape pattern 72, and a metal pattern 73 on the WAT treatment layer 74.

The above example illustrates a manufacturing method of a feeding substrate, but the present disclosure is not limited thereto, and the radiating plate 50 can be manufactured in the same manner.

Through the process described with reference to FIGS. 5 and 6, a plastic material may be selected that meets the requirements according to the application environment, for example, insulating nature, heat resistance, and structural strength, while being lighter, easier to handle, and more moldable than a printed circuit board.

Where an antenna element according to the present disclosure has relatively low-frequency characteristics, these merits over the printed circuit board may be more prominent.

This is because, in antennas with low-frequency characteristics, the radiating element is a structure with a diagonal length of approximately 10 centimeters or more, which, if manufactured as a printed circuit board, the radiating element would suffer from a significant adverse effect on the size, weight, and manufacturing cost.

On the other hand, according to the present disclosure, freedom of material selection of the insulating substrate 71 is guaranteed, and the antenna element structure can be manufactured using only low-cost, large-scale processing processes such as material cutting, laminating, and thermal curing.

Furthermore, the metal pattern 73 can fully adhere to the insulating substrate 71 without any surface gaps or birdcaging. This can be a very sensitive factor when the antenna has high-frequency characteristics. This means that an antenna element structure of reasonable quality can be manufactured without the use of printed circuit boards.

Figure 7:
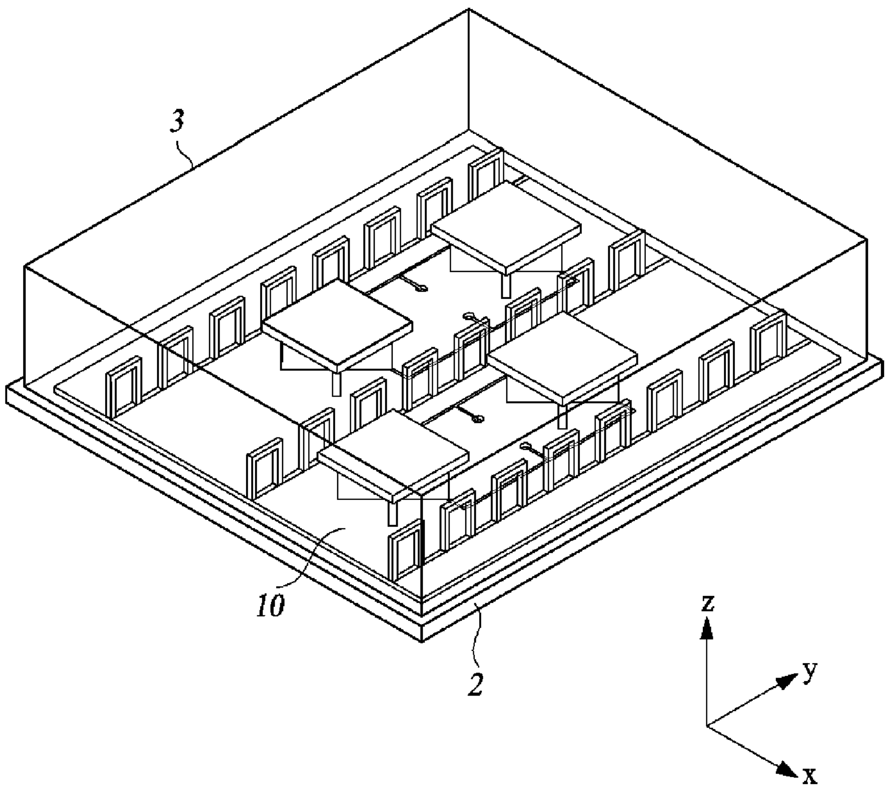
FIG. 7 is a partially see through perspective view of a dual polarization antenna assembly according to at least one embodiment of the present disclosure.

FIG. 7 is a partially see through perspective view of a dual polarization antenna assembly according to at least one embodiment of the present disclosure.

Referring to FIG. 7, a dual polarization antenna assembly according to at least one embodiment of the present disclosure includes a casing 2, one or more dual polarization antennas disposed on one side of the casing 2, and a radome 3 covering the plurality of dual polarization antennas. The casing 2 may be configured to support one or more dual polarization antennas.

In this embodiment, each of the dual polarization antennas is substantially identical to the dual polarization antenna previously described with reference to FIGS. 1 through 6, and the plurality of dual polarization antennas share a single base substrate 10.

Although exemplary embodiments of the present disclosure have been described for illustrative purposes, those skilled in the art will appreciate that various modifications, additions, and substitutions are possible, without departing from the idea and scope of the claimed invention. Therefore, exemplary embodiments of the present disclosure have been described for the sake of brevity and clarity. The scope of the technical idea of the embodiments of the present disclosure is not limited by the illustrations. Accordingly, one of ordinary skill would understand the scope of the claimed invention is not to be limited by the above explicitly described embodiments but by the claims and equivalents thereof.

The invention claimed is:

1. A dual polarization antenna, comprising:

a base substrate;

a power feeding unit supported on the base substrate; and a radiating plate supported on the power feeding unit, wherein the first feeding substrate comprises:

a first insulating substrate supported on the base substrate, and a first feed line attached to the first insulating substrate and configured to supply a first reference phase signal to a first point on the radiating plate and to supply to a second point on the radiating plate, a first reverse phase signal having a reverse phase relative to the first reference phase signal, and wherein the second feeding substrate comprises:

a second insulating substrate supported on the base substrate, and a second feed line attached to the first insulating substrate and configured to supply a second reference phase signal to a third point on the radiating plate and to supply to a fourth point on the radiating plate, a second reverse phase signal having a reverse phase relative to the second reference phase signal, wherein the first feeding substrate and the second feeding substrate each comprise:

an adhesive tape pattern disposed on each of the first insulating substrate and the second insulating substrate, and wherein the first feedline and the second feedline each comprise:

a metal pattern attached to the adhesive tape pattern, wherein the metal pattern further comprises a waterproof adhesion technology (WAT) treatment layer that is disposed on the adhesive tape pattern.

2. The dual polarization antenna of claim 1, wherein the adhesive tape pattern on the first insulating substrate, the adhesive tape pattern on the second insulating substrate, and the WAT treatment layer of the metal pattern are fixed through a heat curing process.

3. The dual polarization antenna of claim 1, wherein the first feeding substrate and the second feeding substrate are vertically upright on the base substrate, and the first feeding substrate and the second feeding substrate have respective midsections that intersect perpendicular to each other.

4. The dual polarization antenna of claim 1, wherein the first feeding substrate is disposed parallel to a straight line connecting the first point and the second point, and the second feeding substrate is disposed parallel to a straight line connecting the third point and the fourth point.

5. The dual polarization antenna of claim 1, wherein the radiating plate is square, the first point, the second point, the third point, and the fourth point are adjacent to four vertices of the radiating plate, and the radiating plate has a diagonal length that is equal to a half wavelength of a center frequency of a frequency in use.

6. The dual polarization antenna of claim 1, wherein the first feed line is connected to a signal line of the base substrate through one solder joint, and the second feed line is connected to another signal line of the base substrate through another solder joint.

7. A dual polarization antenna assembly, comprising:

a casing;

one or more of the dual polarization antenna according to claim 1 disposed on the casing; and a radome configured to cover the one or more of the dual polarization antenna.

* * * * *